Nov. 1, 1932.      A. J. BOCZ      1,886,246

HARMONIC ANTIVIBRATOR

Filed July 30, 1927     3 Sheets-Sheet 1

INVENTOR
Alexander J. Bocz
BY

ATTORNEY

Nov. 1, 1932.  A. J. BOCZ  1,886,246
HARMONIC ANTIVIBRATOR
Filed July 30, 1927   3 Sheets-Sheet 2

INVENTOR
Alexander J. Bocz
BY

ATTORNEY

INVENTOR
Alexander J. Bocz

Patented Nov. 1, 1932

1,886,246

UNITED STATES PATENT OFFICE

ALEXANDER J. BOCZ, OF DETROIT, MICHIGAN

HARMONIC ANTIVIBRATOR

Application filed July 30, 1927. Serial No. 209,460.

REISSUED

My invention relates to a new and useful balancer for engines, machines, apparatuses, etc. attached to rotate with a part where the vibrating force or forces are delivered thereto.
It is an object of the present invention to provide a device which counteracts the unbalanced force or forces set up in a revolving part or shaft and to overcome the out of balance of the revolving part or shaft thus eliminating any vibration whether due from out of balance or from the uneven forces delivered thereto.

The vibration resulting from these forces, for instance, in an internal combustion engine used for driving automobiles and other vehicles in which it is most desirable that the vibrations be reduced to a minimum to permit the building of light, cheap and durable cars and for other industrial purposes, also to prolong the life, cheapen the building and reduce the noise of machines, apparatuses, etc. The various forces which give rise to the objectionable vibrations have been described by me in co-pending applications, Serial Nos. 747,261, 223,226—376,909 and in my Patent 1,756,898, they have been classified in their effect on the shaft or a revolving part and how they cause vibration.

As the present invention provides a simple and more sensitive means it is more effective for counterbalancing all the unbalanced forces. In my patent and my co-pending applications, I referred to the forces as being counterbalanced by the devices illustrated therein and the present invention has for its object a simpler structure, which may be mounted on or between yieldable or flexible means and said means being in turn, attached to a revolving part, therefore it is cheaper to manufacture and more easily and quickly assembled than the structure referred to in the patent and applications because the mounting on which my device is mounted, concentrates all the forces almost to this point, on or between which the flexible or yieldable disc or spokes are mounted and on which the said balancing mass or masses are concentrically mounted, and during operation the mounted device assumes its own revolving center line due to the flexible mounting.

The various modifications are shown, various adaptations of the means are employed, and indicated in which the inventions may be used without departing from the spirit and scope of the invention.

I embody my invention in the accompanying drawings, which form a part of this specification and in which,

Figures 1, 2:
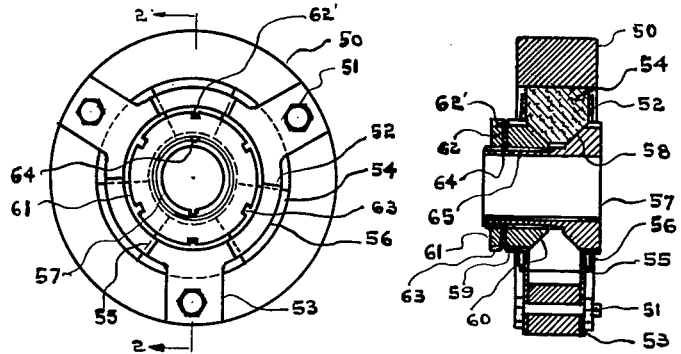
Fig. 1 is a front elevation view of one form of the invention.
Fig. 2 is a sectional view taken on line 2—2 of Fig. 1.

In Fig. 1 I have a flywheel comprising an annular rim 50. Secured by suitable bolts 51 passed therethrough to the faces of the said rim 50, the retainers 52, having the tongues 53, radiating outwardly therefrom. These retainers are adapted to engage firmly the segments 54, which are formed wedge-shaped and made from some yieldable material, such as rubber etc.

These retainers are alternately offset as at 55, to provide pockets 56, in which the segments engage so that the rim 50, segments 54, and the retainers 52 are assembled.

The device is ready to be mounted on a revolving part. For instance, I provide a sleeve 57 which may be keyed to the revolving part and which is threaded on its periphery. This sleeve has at one end 58 a tapered face on its inner side. A nut 59 is adapted for threading on the sleeve 57; this nut is also provided with a beveled inner face 60. The said segments, retainers and ring assembled and positioned on the sleeve in the manner shown in Fig. 2, a threading of the nut 59 will effect a clamping of the segments. This wedge-shaped arrangement forces the segment radially to firmly engage the inner surface of the rim 50 and thus limiting the movements of said rim in all directions on the said segments.

A lock nut 61 is threaded on the sleeve 57 and serves to lock the nut 59 in its position. I have also provided a lock 62 which has portions 62' angularly turned to engage in notches 63 formed in the lock nut 61 and which also has an inwardly projection tongue 64 to engage in a groove 65 formed in the sleeve 57.

In operation the rim is free to move in all directions in its plane of revolution, these movements being limited only by the yieldable segments 54. Any movement of the said rim opposes the unbalanced forces of a revolving part regardless of their directions, and therefore neutralizes them.

When the device is in a plane of rotation, the rim is in its state of inertia; when the torque reaction tends to displace its centerline of revolution, either through whipping, twisting or bending the shaft or in any other way strives to move the device out of its plane of revolution. Since the rim is combined with yieldable connections, and said connections are attached to said shaft, the yieldable segments respond to said forces and deliver a strain to the rim 50, which is resisted by the inertia of said rim in an opposite direction.

It is thus seen that I have provided a flexible flywheel in which the spokes are the yieldable segments and the rim is mounted concentrically on said segments, which are in turn attached to the revolving shaft or a body, so the inertia of the rim always resists any displacement of the centerline of the said revolving shaft or part and the yieldable segments (spokes) limit the displacement of said rim in all directions.

This same arrangement is maintained throughout the various modifications which I have shown and illustrated in the drawings and in those particular instances in which some special operation of the device is effected, attention will be directed thereto.

Figures 3, 4:
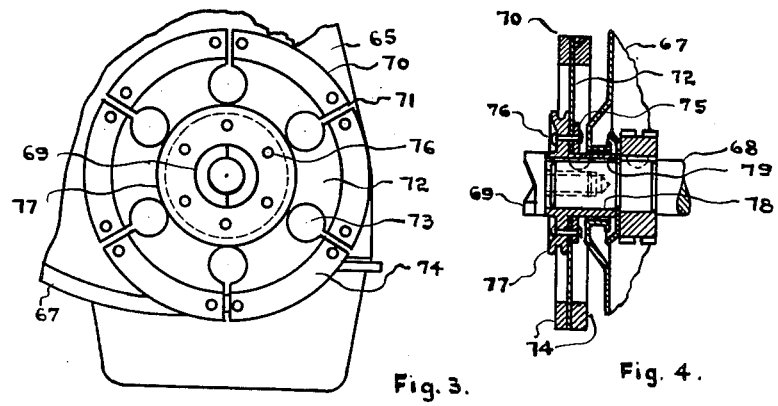
Fig. 3 is a front elevational view of a modified form of the invention showing it applied to an engine illustrated in fragment.
Fig. 4 is a side elevational view of the form shown in Fig. 3, with parts broken away and parts shown in section.

In Figs. 3 and 4 I have illustrated a modified form of my invention combined with an internal combustion engine showing the timer housing 67. The balancing device is mounted on the front end of the crank shaft 68 and held in place by the starting jaw nut 69 comprising a flywheel 70 having slits 71 in the web 72 to increase the flexibility of the web of said flywheel and circular holes 73 are provided to further increase the flexibility of said web 72 and a rim or sections of said rim 74 secured thereto.

In Fig. 4 is shown the manner of mounting the web 72 by using a collar 75 and bolts, rivets or other means 76 for attaching the center portion of the web 72 to the fan pulley 77, which has an extending sleeve 78 provided with a key way 79 which is keyed to the crank-shaft 68.

In this structure I use the web of said flywheel as flexible spokes as described on the edge of which is the rim or sections of said rim attached, therefore I have a revolving flywheel and the center portion of the web of said wheel is secured by some means to the part to be balanced.

During operation the inertia of the rim always resists the displacement of the centerline of the said revolving shaft and the flexible web limits the displacement of said rim axially and radially and in addition the segments will move universally partly due to the flexibility of the divided web.

Figures 5, 6:
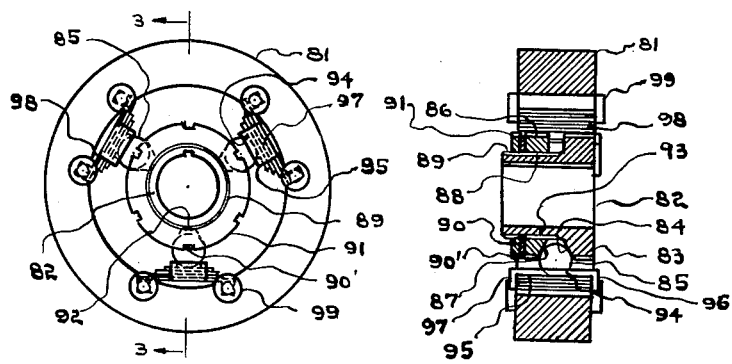
Fig. 5 is a front elevational view of another modified form of the invention.
Fig. 6 is a sectional view taken on line 3—3 of Fig. 5.

In the structure shown in Figs. 5 and 6, the flexible flywheel comprising a rim 81 and having a hub or sleeve 82 and at one end has a flange 83 and inside of the said flange are beveled pockets 84 to secure the balls 85 in a stationary position with a ring 86 which also has beveled pockets 87 and is provided with a hole 88 in its center to slip over the threaded end diameter of the hub 89, a lock washer 90 has portions 90' angularly turned to engage the notches in the lock nut 91 and it has an inwardly projecting tongue 92 to connect a groove 93 formed in the hub 82. These balls 85 engage in an opening 94 formed in the saddle 95 the legs 96 and 97 of which embrace the spring leaves 98 through which bolts or notches are provided for securing the same to the saddle 95. The ends of the longest leaf of said springs engage the pins 99 which are secured on the rim 81. By turning the nut 91 on the threaded end of the sleeve 89 which forces the balls 85 to clamp the springs 98 firmly, the pins 99 the rim 81 and the sleeve 82 are in an assembled position. And the portion 90' is turned into one of the notches of the lock nut 91 against disengagement.

The assembled balancing device is then attached to any revolving shaft, part or body to be balanced, and during operation the rim will be the balancing mass and the resilient spokes are the springs, which are in turn attached to a revolving part and the flexible flywheel will function exactly as described in Figs. 1 and 2.

Figure 7:
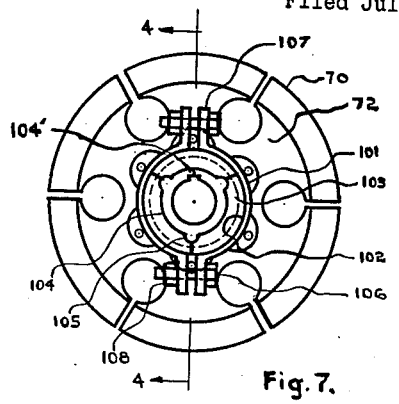
Fig. 7 is a front elevational view of another modified form of the invention.
Figure 8:
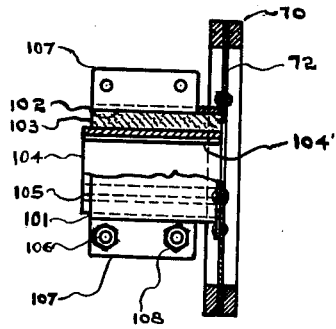
Fig. 8 is a view taken on line 4—4 of Fig. 7.

In Figs. 7 and 8 I have illustrated a type of the balancing device 70 already described in Figs. 3 and 4 and provided with a tubular clamp 101 to which the flexible web 72 is attached by some means and the inside of the tubular clamp 102 is lined with some yieldable material blocks 103 which are slipped over the hub or sleeve 104 and provided with ribs 105 to insure a permanent position for the said blocks and said tubular clamp on the sleeve 104. The bolts 106 are projected through the lugs 107 formed on the said clamp and the nuts 108 are turned to set the required tension for clamping the filler blocks 103 to the sleeve 104. The said sleeve has a key-way 104' for attaching to a shaft. The flexible flywheel is mounted on yieldable means and can resist bodily through the yieldable mounting against any vibration regardless of their directions and in addition will perform all movements in the rim or segments 74 as described in Figs. 3 and 4.

By mounting the flexible device on yieldable means less weight is required to balance vibrations because the forces are concentrated on the filler blocks 103. The radius of which is smaller than the radius of the inertia of the body of the balancing device.

Figure 9:
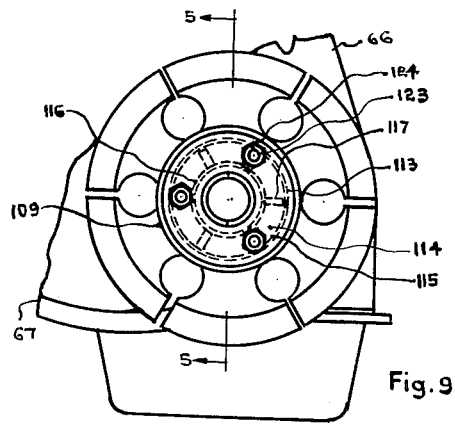
Fig. 9 is a front elevational view of an engine in fragment showing another form of the invention applied thereto.
Figure 10:
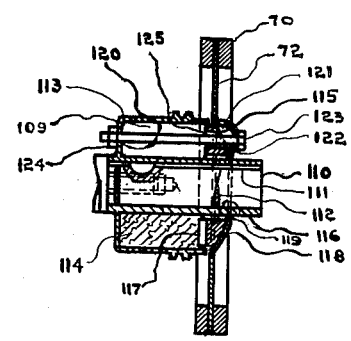
Fig. 10 is a fragmentary view taken on line 5—5 of Fig. 9.

In Figs. 9 and 10 I have illustrated an internal combustion engine having a timer housing 67. The selected flywheel is described in Figs. 3 and 4 or any device can be applied for mounting as shown in Fig. 10.

A fan pulley 109 is provided with a sleeve 110 and it has a key-way 111 to secure it to the crank shaft 112.

The hole 113 is filled with yieldable blocks 114. A convex collar 115 is smaller than said hole and has an opening 116 in the center, through which is projected the said sleeve. Rollers 117 are placed into grooves provided in the collar 115 and into the blocks 114.

The center portion of the web is provided with a large hole 119 and a portion 118 which partly embraces the surface of the said convex collar. In Fig. 10 is shown the fan pulley 109 having holes 120. The web 72 is provided with bosses 121 in which are the holes 122. These holes are larger than the bolts 123 which project therethrough between the blocks 114. The nuts 124 on the bolts 123 serve to clamp the device in the assembled position shown in Fig. 10 and to put the proper tension on the yieldable blocks 114.

The assembled device requires less weight to balance the unbalanced forces because the total body weight of the balance is concentrated to a mean diameter, which diameter is smaller than the flexible web. This will permit the employment of less weight and will be more sensitive for action than my previous balancers.

The body mass of the device is displaceable axially due to the yieldability of said blocks, and radially due to the rollers 117 which engage the surface of the said blocks, and circumferentially due to the rollers 117 which are embodied in the blocks 114 and due to the convexity of the collar; in other words it is movable universally on its mounting. Of course any or all of the combined movements are limited by yieldable means and always oppose any vibration regardless of their directions.

The yieldable blocks 114 are enclosed in a space to prevent any flow of the material in any direction and for preserving the yieldability of said material for an indefinite time.

Figure 11:
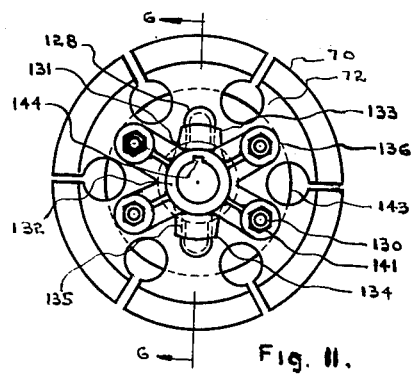
Fig. 11 is a front elevational view of a further modified form of the invention.
Figure 12:
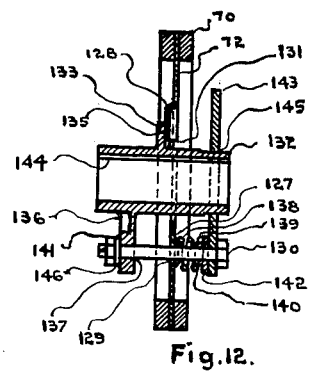
Fig. 12 is a section view on line 6—6 of Fig. 11.

In Figs. 11 and 12 are shown further modified forms of my invention. The web of the flexible flywheel 70 is altered to suit the flexible mounting as shown in Fig. 12.

The web 72 has bosses 127 and beads 128. These bosses are provided with large holes 129 for the bolts 130. The center portion of said web has a large hole 131 through which the sleeve 132 passes. The sleeve 132 has a pair of lugs 133 and 134, each of which has its inner face formed with a convex portion 135 which accommodates the beads 128. The arms 136 radiate outwardly from the sleeve and the bolts 130 are projected through the holes 137 in the said arms.

One end of each of the springs 138 engages the bosses 127 and the other ends 139 of said springs engage the bushings 140 to guide and square the said springs against deflections. Each of the said bushings are provided with a hole in which the bolts 130 are slipped through and a flange 142 insures a good bearing surface on a collar 143 which has holes for the bolts 130 and its center has a larger hole 145 for pressing the same on the sleeve 132.

The ends of the said bolts are provided with nuts 146 and lock washers 141 to adjust the proper tension on the said springs. The parts are assembled with the flexible flywheel 70 and the sleeve 132 having a key-way 144 on a revolving part to prevent vibrations.

The rim or sections, which are attached to the flexible web of the flywheel will balance the same vibrating forces as described in Figs. 3 and 4; in addition the total body weight of said wheel would act as the balancing mass to overcome the vibrations of the other end of said shaft through the resilient mounting.

The difference of the diameters of the mounting and the device permits the building of a lighter and much more sensitive device.

Figures 13, 14:
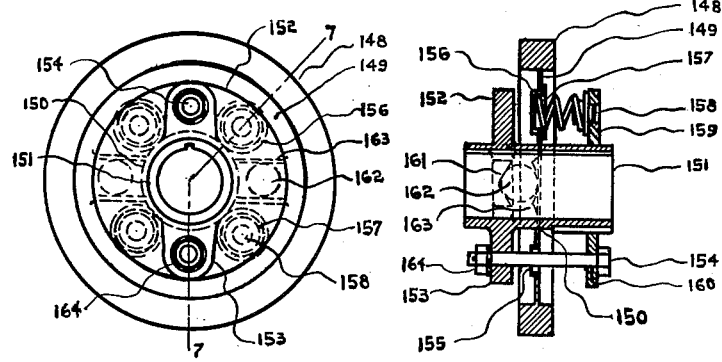
Fig. 13 is a front elevational view of a further modified form of the invention.
Fig. 14 is a sectional view taken on line 7—7 of Fig. 13.

In Figs. 13 and 14 is shown and illustrated a different type of my invention and its mounting is shown in Fig. 14. The rim 148 is formed integral with the flexible web 149. This web contains several openings, in the center the opening 150 is larger than the diameter of the sleeve 151 which opening the said sleeve is passed through. The sleeve has a flange 152 and bosses 153 provided with holes for the bolts 154. In the web 149 the holes 155 are larger than the diameter of said bolts.

A cup, 156 is pressed into the openings of the said web, in which is secured one end of the springs 157 against misalinement, the other end of the said springs is located on guide and square pins 158, which are pressed into a collar 159 which has holes 160 for the bolts 154 and the said collar is slidable on the outer diameter of the said sleeve and a key is used to prevent the turning of the said collar on the sleeve 151.

By this method or a similar one the springs are guided and squared against deflection or misalinement to prevent the natural vibration of the springs.

The inner surface of the said flange is provided with pockets 161 to locate the balls 162; they are engaged by projections 163 which are formed on the web 149.

The nuts 164 are turned to adjust the proper tension on the springs 157 and the device is assembled and shown in Fig. 14.

The sleeve 151 is provided with a key way to fasten the assembled device on a shaft or body.

During the revolution of the device, the total weight of the balancer is capable of moving axially, radially and circumferentially; in addition the weight of the ring takes care of only the movement for which it was built.

Figures 15, 16:
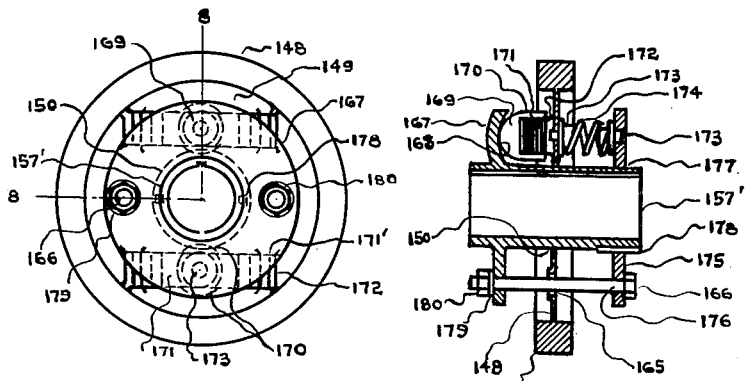
Fig. 15 is a front elevational view of a further modified form of the invention.
Fig. 16 is a sectional view taken on line 8—8 of Fig. 15.

In the form in Figs. 15 and 16 is shown and illustrated an entirely different type of my invention and the flexible flywheel or the balancer is mounted between flexible means as shown in Fig. 16.

The rim 149 is formed in one piece with the flexible web 148. This web contains several holes; the center hole 150 is a large hole in which the sleeve 157' projects through, the small holes 165 are larger than the bolts 166 in said web.

The inside of the flange 167 is provided with grooves 168 to engage the semi-ball ends of the saddle 169 and they have arms 170 to embrace the leaves of the springs 171 and they are kept together by some means.

The longest ends of the leaf springs 171' are located on projections 172 formed on the said web. The guiding and squaring pins 172 are pressed into the other side of said web, on which is mounted one end of each of the coil springs 174. The other end of each of said springs is located on the squaring and guiding pins 173 which are pressed into a collar 175 and said collar is provided with holes for the bolts 176 and the center portion 177 of said collar fits on the sleeve, which has a key 178 to prevent the collar 175 from turning.

Another way is shown, how to guide the springs against deflection through coring to keep the end of the springs square with the centerline to prevent the natural vibration of springs.

The washers 179 and nuts 180 are on the bolts 176 as shown in Fig. 16 and by turning the said nuts the proper tension is put on the said flexible means. The device is assembled and it can be attached to a revolving part to overcome all vibrations, whereby the mounted body of the device is used as an inertia member. Besides that the ratio of the mean diameter to which the forces are delivered thereto is smaller than the mean diameter of the device; for this reason it can be built much lighter in weight; in addition the mounted balancer can take care of the movement for which it was built.

During operation the flexible mounting and the body inertia of the device co-operate for counter balancing the unbalanced forces which is already described in Figs. 1 and 2.

Figures 17, 18:
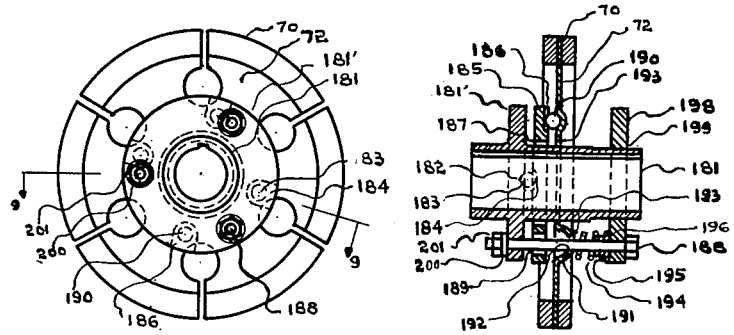
Fig. 17 is a front elevation view of a different form of the invention.
Fig. 18 is a sectional view taken on line 9—9 of Fig. 17.

In Figs. 17 and 18 I have shown a balancing device with a different method of mounting.

The hub or sleeve 181 has a flange 181' in the face of which are pockets 182 in which the balls 183 are seated and the said balls engage the grooves 184 in a variable spacer 185 and the opposite side of said spacer is also provided with grooves 186. In the center part of said spacer is a large hole 187 through which the sleeve projects. The bolts 188 pass through the holes 189 in the said spacer.

The balls 190 are engaged in the grooves 186 and are fastened in the flexible web 72. This web has in the center thereof a large hole 193 through which the sleeve 181 is projected and bosses 191 with large holes 192 through which the bolts 188 pass.

One end of each of the springs 193 is located on the said bosses and the other ends of said springs 194 are inserted in bushings 195 and each of them is provided with a hole and a flange 196, the said flange being connected to a collar 198 which has a large hole 199 to slip over the sleeve 181 and is also provided with holes for the said bolts.

The bolts 188 have, as shown in Fig. 18, lock washers 200 and nuts 201 at the ends thereof and turning the nuts on the bolts puts the necessary tension on the springs 193.

During the operation the body inertia of this device is variable, because the spacer is slidable and through its inertia will displace the revolving centerline of the device for counter-balancing the unbalanced forces, which displacement increases the concentrated lever of the balancing mass, therefore it can be built much lighter.

Each of the various forms of the invention illustrated are believed to be practical as simple methods are used for overcoming the unbalanced forces and the out of balance which may exist in any revolving part of an engine machine, where it is desirable to reduce such vibrations.

In the claims it will be noted that the strain exerted by a revolving part to eliminate or counteract vibrations due to the unbalanced forces in the shaft or part is characterized by the revolving body mass or masses being moved under the combined influence of a rotating yieldable or flexible mounting and flexible connections of a flexible disc to which the balancing weight or weights are attached.

I do not wish to limit myself to the precise details of the structures shown but desire to avail myself of such variations and modifications as may come within the scope of the appended claims.

Having thus described my invention what I claim as new and desire to secure by Letters Patent is:

1. A balancer adapted for use with a revolving part driven by an engine to overcome the vibrations of said engine comprising a flexible sectioned flywheel and means attaching the center of said flywheel with the part driven by said engine, said sections having independent movements from each other in response to impulses delivered thereto.

2. A balancer adapted for use with a revolving part of an engine to overcome the vibrations of said engine comprising a flywheel having a rim and a flexible web and slits for dividing said rim and web into sections to have independent movement of each other in response to impulses delivered to said flywheel and means securing said web to said part of said engine.

3. A vibration damper for a shaft comprising a sleeve member adapted to be secured to said shaft, resilient means mounted on said sleeve member, a flywheel structure comprising an inertia ring, a flexible web attached to said ring and means having its sole support on said resilient means for supporting said web.

In testimony whereof I have signed the foregoing specification.

ALEXANDER J. BOCZ.